US009571487B2

(12) United States Patent
Fitzgerald

(10) Patent No.: US 9,571,487 B2
(45) Date of Patent: *Feb. 14, 2017

(54) SYSTEMS AND METHODS FOR PROVIDING A COVERT PASSWORD MANAGER

(71) Applicant: Joseph Fitzgerald, Wheatley Heights, NY (US)

(72) Inventor: Joseph Fitzgerald, Wheatley Heights, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/014,850

(22) Filed: Feb. 3, 2016

(65) Prior Publication Data

US 2016/0156617 A1    Jun. 2, 2016

Related U.S. Application Data

(63) Continuation of application No. 14/511,664, filed on Oct. 10, 2014, now Pat. No. 9,270,670.

(51) Int. Cl.
*G06F 21/31* (2013.01)
*H04L 29/06* (2006.01)
*G06F 21/45* (2013.01)

(52) U.S. Cl.
CPC ............. *H04L 63/083* (2013.01); *G06F 21/45* (2013.01); *H04L 63/10* (2013.01)

(58) Field of Classification Search
None
See application file for complete search history.

(56) References Cited

U.S. PATENT DOCUMENTS

| 4,719,566 A | 1/1988 | Kelley |
| 5,559,961 A * | 9/1996 | Blonder ............ G07C 9/00142 726/18 |
| 6,209,104 B1 * | 3/2001 | Jalili ..................... G06F 21/36 340/5.8 |
| 6,747,676 B2 | 6/2004 | Botz et al. |

(Continued)

FOREIGN PATENT DOCUMENTS

| CN | 101441689 | 5/2009 |
| WO | WO 2009/039223 | 3/2009 |
| WO | WO 2013/038181 | 3/2013 |

OTHER PUBLICATIONS

Yahoo Answers, "I want to create a fake login page for my windows desktop?" [online], [retrieved on Oct. 6, 2014]. Retrieved from the Internet: <URL: https://answers.yahoo.com/question/index?qid=20101013070444AAIXI7r>.

(Continued)

*Primary Examiner* — Christopher Revak
(74) *Attorney, Agent, or Firm* — Bryan Cave LLP

(57) ABSTRACT

The present invention relates to an application that is configured to provide secure access to confidential information. To protect the confidential information, the application may include functions that utilize a decoy application to disguise the functionality of the application. A unique sequence of inputs received through an interface associated with the decoy application may permit a user to access the confidential information. An authorized user that has been provided access to the confidential information may access configuration interfaces that permit the user to define the inputs that will serve as login credentials and to customize the appearance and functionality of the decoy application.

20 Claims, 6 Drawing Sheets

(56) References Cited

U.S. PATENT DOCUMENTS

| | | | |
|---|---|---|---|
| 7,854,005 B2 | 12/2010 | Lyle et al. | |
| 7,904,729 B2 | 3/2011 | Little et al. | |
| 8,271,799 B2 | 9/2012 | Wang | |
| 8,362,875 B2 | 1/2013 | Morin et al. | |
| 8,365,267 B2 | 1/2013 | Wang et al. | |
| 8,528,064 B2 | 9/2013 | Nichols et al. | |
| 8,549,640 B2 | 10/2013 | Lyle et al. | |
| 8,631,038 B2 | 1/2014 | Mellmer et al. | |
| 8,671,058 B1 * | 3/2014 | Isaacs | G06F 21/36 382/100 |
| 9,270,670 B1 * | 2/2016 | Fitzgerald | H04L 63/083 |
| 2002/0191786 A1 | 12/2002 | Marroquin | |
| 2003/0041251 A1 | 2/2003 | Kumhyr | |
| 2004/0181670 A1 | 9/2004 | Thune et al. | |
| 2005/0083195 A1 | 4/2005 | Pham et al. | |
| 2005/0171734 A1 * | 8/2005 | Dropik | G06Q 30/0201 702/182 |
| 2007/0250920 A1 * | 10/2007 | Lindsay | G06F 21/31 726/7 |
| 2008/0301462 A1 | 12/2008 | Dayan et al. | |
| 2009/0235197 A1 | 9/2009 | Chen et al. | |
| 2009/0259588 A1 | 10/2009 | Lindsay | |
| 2009/0260077 A1 | 10/2009 | Zhu et al. | |
| 2010/0043062 A1 * | 2/2010 | Alexander | G06F 21/36 726/6 |
| 2010/0169958 A1 * | 7/2010 | Werner | G06F 21/36 726/6 |
| 2010/0180336 A1 * | 7/2010 | Jones | H04L 9/3226 726/19 |
| 2010/0223579 A1 | 9/2010 | Schwartz | |
| 2010/0325722 A1 * | 12/2010 | Uchida | G06F 21/31 726/19 |
| 2012/0297472 A1 * | 11/2012 | Tamura | H04L 63/0815 726/8 |
| 2013/0160079 A1 * | 6/2013 | Hebert | H04L 63/1491 726/3 |
| 2013/0185781 A1 * | 7/2013 | Hou | G06F 21/41 726/6 |
| 2013/0301830 A1 | 11/2013 | Bar-El et al. | |
| 2014/0129974 A1 | 5/2014 | Ben-Harrush et al. | |
| 2014/0143554 A1 * | 5/2014 | Torkkel | G06F 21/45 713/193 |
| 2014/0215356 A1 * | 7/2014 | Brander | H04L 67/36 715/753 |

OTHER PUBLICATIONS

Purch, 10 Top Ten Reviews, "How Password Management Software Can Thwart Hackers" [online], [retrieved on Oct. 6, 2014]. Retrieved from the Internet: <URL: http://password-management-software-review.toptenreviews.com/how-password-management-software-can-thwart-hackers.html>.

Google play, KeyRing Free Password Manager [online], [retrieved on Oct. 6, 2014]. Retrieved from the Internet: <URL: https://play.google.com/store/apps/details?id=house_intellect.keyring_free>.

McCarney, "Password Managers: Comparative Evaluation, Design, Implementation and Empirical Analysis" [online], Aug. 26, 2013 [retrieved on Oct. 6, 2014]. Retrieved from the Internet: <URL: https://binaryparadox.net/assets/pubs/McCarney.MCS.Archive.pdf>.

Password Manager [online], [retrieved on Oct. 6, 2014]. Retrieved from the Internet: <URL: http://www.mytextreader.com/PasswordManager/help.htm>.

AppAdvice, "Secret and Password Keeping Apps" [online], [retrieved on Oct. 6, 2014]. Retrieved from the Internet: <URL: http://appadvice.com/appguides/show/secret-keeping-apps>.

VIPole, "Mobile Secure Messenger for Android" [online], [retrieved on Oct. 6, 2014]. Retrieved from the Internet: <URL: <https://www.vipole.com/en/features/mobile>.

* cited by examiner

SYSTEMS AND METHODS FOR PROVIDING A COVERT PASSWORD MANAGER

CROSS-REFERENCE TO RELATED APPLICATIONS

This application claims benefit to and is a continuation of U.S. application Ser. No. 14/511,664 filed on Oct. 10, 2014, the contents of which is herein incorporated in its entirety.

FIELD OF THE INVENTION

The present principles are directed to systems and methods for protecting confidential information and, more particularly, to providing a password manager application that includes a covert login interface for accessing confidential information.

BACKGROUND OF THE INVENTION

Many computer applications are used to store confidential information. For example, an application may store confidential information such as password information, medical information, financial information or personal contact information. A user may be required to enter login credentials before the user is permitted to access the confidential information. For example, a user may be presented with a login screen that includes an input form for receiving a username and password. After the user has submitted the login credentials, the application may determine whether the login credentials are valid. If the login credentials are determined to be valid, the user is given access to the confidential information that is maintained by the application. On the other hand, the user may be denied access to the confidential information if the login credentials are not valid.

Providing access to confidential information in the manner described above presents security concerns. The traditional login interface invites unauthorized users to enter login credentials and to attempt to improperly gain access to the confidential information that is protected by the application. Hackers or other unauthorized users are aware that they are able to gain access to the confidential information if they are able to enter valid login credentials via the application's login interface. Because the unauthorized users are aware of the location of the login interface, they can attempt to access the confidential information by manually entering login credentials or by writing password cracking programs. While some applications incorporate additional security features as part of the login process (e.g., limiting the number of invalid login attempts that are permitted), there is still a relatively high risk that unauthorized users may gain access to underlying confidential information that is maintained by the application. Thus, there is a need to provide a means for accessing confidential information that eliminates, or at least minimizes, these risks.

SUMMARY OF THE INVENTION

The present invention relates to an application that is configured to provide secure access to confidential information (e.g., password information, medical information, financial information, personal contacts information or other type of confidential information). To protect the confidential information, the application may include functions that utilize a decoy application to disguise the functionality of the application. A unique sequence of inputs received through an interface associated with the decoy application may permit a user to access the confidential information. An authorized user that has been provided access to the confidential information may access configuration interfaces that permit the user to define the inputs that will serve as login credentials and to customize the appearance and functionality of the decoy application.

In accordance with certain embodiments, a system, method and computer program product is provided that are configured to provide secured access to password information. An application may be provided that includes a password manager module and a decoy module. The password manager module may be configured to perform password management functions associated with accessing and managing password information. A decoy module may be configured to disguise the password management functions of the application by providing a decoy function and one or more associated interfaces that are unrelated to managing the password information. In response to receiving a request from a user to access the application, instructions may be provided for rendering an interface associated with the decoy function that includes an input form. Data may be stored that associates an expected data type with at least one input field of the input form. Input received via the input form is evaluated to determine whether or not the user is attempting to access the password information by comparing the data type of the input received via the at least one input field with the expected data type that is associated with the at least one input field. In response to determining that the data type of the input received via the at least one input field is not the expected data type, a determination is made that the user is attempting to access the password information. The input is then analyzed to determine whether the user has submitted valid login credentials. Access is provided to the password information in response to determining that the user has submitted valid login credentials. An authorized user is provided access to a configuration interface that allows the authorized user to specify the login credentials by selecting keyboard events, click events and data form entry events and by associating expected data types with input fields associated with the data form entry events.

These and other features and advantages will become apparent from the following detailed description of illustrative embodiments thereof, which is to be read in connection with the accompanying drawings.

BRIEF DESCRIPTION OF DRAWINGS

The inventive principles are illustrated in the figures of the accompanying drawings which are meant to be exemplary and not limiting, in which like references are intended to refer to like or corresponding parts, and in which.

DETAILED DESCRIPTION OF THE EMBODIMENTS

Figure 1:
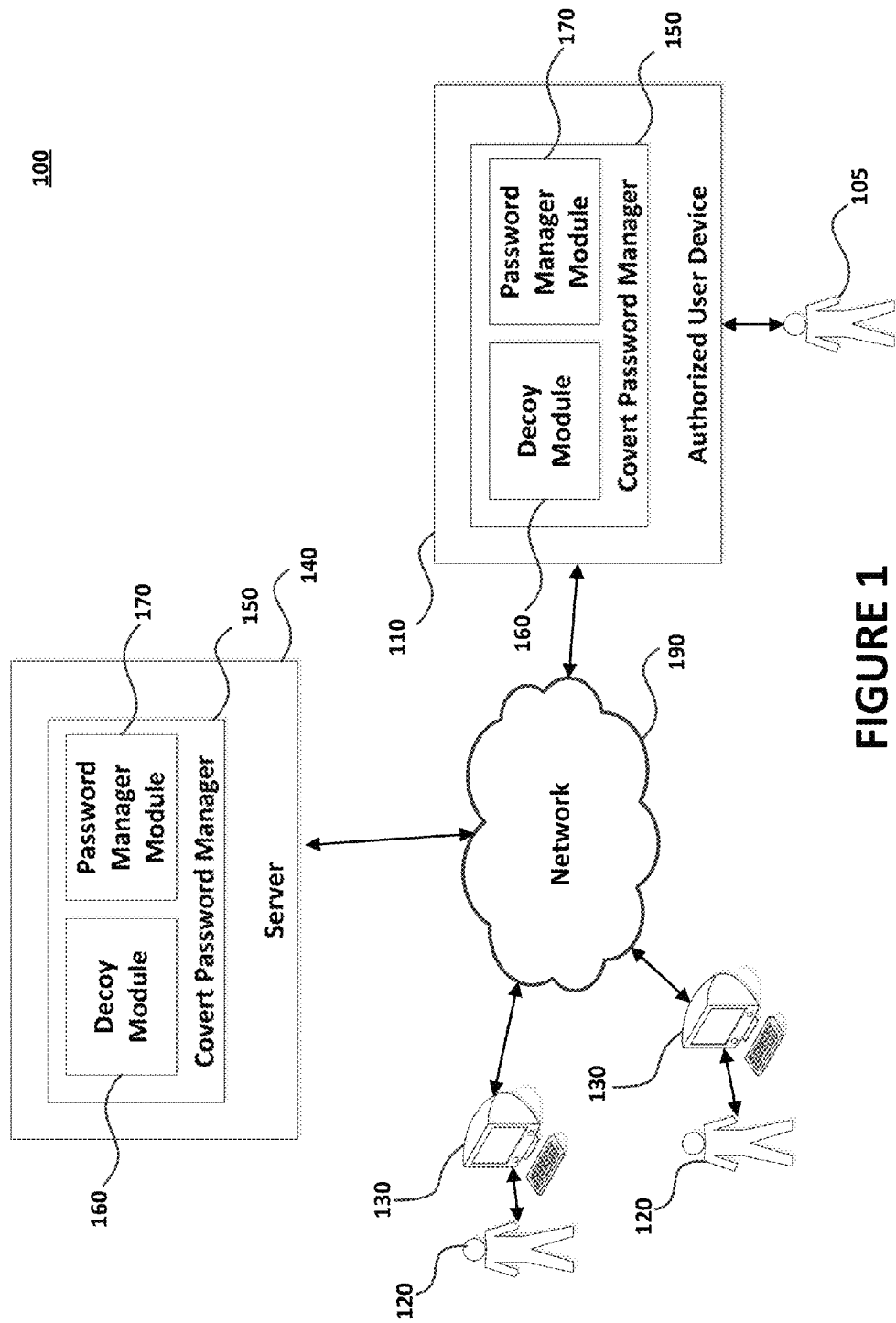
FIG. 1 is a block diagram of a system for securely protecting password information in accordance with certain embodiments of the present invention.

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

In accordance with certain embodiments, an application is configured to provide secure access to confidential information. The confidential information may include password information, medical information, financial information, personal contacts information or other type of confidential information. To protect the confidential information, the application may initially present a user with a "decoy application" that is configured to display interfaces and perform functions that are unrelated to managing confidential information. The decoy application may be a separate application that is launched by application that maintains the confidential information, or may represent a function that is executed by the application. When a user executes or accesses the application, the features of the application relating to protecting and managing the confidential information are hidden and/or disguised. Inputs received from the user may be used to execute functions associated with the decoy application. One or more of the interfaces associated with the decoy application may also serve as a covert login screen that enables the user to submit login credentials for accessing the confidential information. The login screen is "covert" in the sense that it appears to be an interface associated with executing the functionality of the decoy application and does not appear to be an interface that will permit a user to submit login credentials for accessing the confidential information. Input received via the interface may be used to execute decoy functions associated with the decoy application. However, entering input in a particular manner that is predetermined by an authorized user will allow a user interacting with the interface to access the confidential information. In certain embodiments, the input permits access to the confidential information comprises both one or more character-based inputs (e.g., text submitted via an input form) and one or more non-character inputs (e.g., selecting or clicking-on an image that is displayed on an interface).

According to certain embodiments, the application may analyze the input provided by the user to determine whether the input is provided as an attempt to login and access the confidential information, or whether the input is provided to execute the decoy application. This determination may be based, at least in part, on an expected data type for the input. For example, the interface that is displayed to the user may include an input form or an input field that requests a numerical value, such as an integer value or floating-point value, from the user. The application may use the input to execute the decoy function in the event that data type of the input is of the data type which is expected. On the other hand, the application may determine that the user is attempting to login and access the confidential information in the event that the input provided by the user is of an unexpected data type. For example, the application may determine that the user is attempting to login and access the confidential information if the user submitted a character string comprising alphabetical letters in an input field of a form in which an integer value was expected. Providing the unexpected data type may cause the application to evaluate the input provided by the user as a login attempt. The input provided by the user may then be analyzed to determine whether the input comprises valid login credentials for accessing the confidential information.

The user may be presented with an interface for managing the confidential information in the event that the user submitted valid login credentials. In addition to providing interfaces that allow the user to manage the confidential information, the user may also be given access to one or more configuration interfaces that permit the user to customize certain features of the application. For example, the configuration interfaces may permit the user to define the sequence of input that comprises valid login credentials and to customize the appearance and functionality of the decoy application. On the other hand, if the input provided by the user did not comprise valid login credentials, the user may be denied access to the confidential information and the input provided the user may be used to execute the decoy function.

The embodiments described in this disclosure can be combined in various ways. Any aspect or feature that is described for one embodiment can be incorporated into any other embodiment mentioned in this disclosure. Moreover, any of the embodiments described herein may be hardware-based, software-based and preferably comprise a mixture of both hardware and software elements. Thus, while the description herein may describe certain embodiments, features or components as being implemented in software or hardware, it should be recognized that any embodiment, feature or component that is described in the present application may be implemented in hardware and/or software. In certain embodiments, particular aspects are implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer-readable medium may include any apparatus that stores, communicates, propagates or transports the program for use by or in connection with the instruction execution system, apparatus, or device. The medium can be a magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The discussion that follows describes an exemplary application that is configured to provide secure access to password information. However, it should be recognized that the principles disclosed herein can be used to provide access to any type of confidential information (e.g., financial information or medical information) and that appropriate modifications may be made to account for the type of confidential information that is being protected.

Referring now to the drawings in which like numerals represent the same or similar elements and initially to FIG. 1, an exemplary system 100 is disclosed for securely accessing password information. The system 100 includes a covert password manager 150 that is configured to securely store password information (and/or other confidential information) for authorized users 105. An authorized user 105 may represent any individual that entitled to access the password information. The covert password manager 150 may represent an application that is stored on client devices 110 that are operated by or associated with authorized users 105, or may represent an application that is stored or hosted on one or more servers 140 that are accessible to the over a network 190.

Unauthorized users 120 (e.g., hackers or other persons who do not have permission to access the password information that is protected by the covert password manager 150) may attempt to gain access to the password information stored by the covert password manager 150. For example, in the case that the covert password manager 150 is installed on a client device 110 associated with an authorized user 105, an unauthorized user 120 may attempt to access the password information via the network 190 (e.g., by remotely accessing the client device 110 using an authorized user device 130) or by physically utilizing the client device 110 (e.g., if the client device 110 comes into the possession of the unauthorized user 120). Similarly, in the case that the covert password manager 150 is installed on a server 140, an unauthorized user 120 may attempt to access the password information stored on the server 140 over the network 190 utilizing an authorized user device 130. Regardless of where the covert password manager is installed, the covert password manager 150 includes security features that can assist with preventing unauthorized users 120 from accessing the protected password information.

The network 190 illustrated in FIG. 1 may be any type of network, such as one that includes the Internet, a local area network, a wide area network, an intranet, etc. The client devices 110, unauthorized user devices 130 and server 140 may be configured to communicate via wired or wireless links, or a combination of the two. In certain embodiments, the client devices 110 and authorized user devices 130 may represent a desktop computer, laptop computer, cell phone, tablet device, personal digital assistant or other type of computing device. Each of these devices 110 and 130 may be equipped with one or more computer storage devices (e.g., RAM, ROM, PROM, SRAM, etc.) and one or more processing devices (e.g., a central processing unit) that are capable of executing computer program instructions. The computer storage devices are preferably physical, non-transitory mediums. The client devices 110 and authorized user devices 130 may further include a display that is capable of rendering interfaces and one or more input devices (e.g., keyboard, microphone, camera, video camera, scanner, joystick, remote control device, etc.). A user may manipulate interfaces rendered on the display using the input devices to communicate and/or interact with a covert password manager 150 located on either the client device 110 or the server 140.

The server 140 may also include one or more processors and one or more computer storage devices. The computer storage devices are preferably physical, non-transitory mediums. The server 140 may generally represent any type of computing device that is capable of communicating with a client device 110 and/or unauthorized user device 130 over the network 190. In some embodiments, the server 140 comprises one or more mainframe computing devices that execute a web server for communicating with these devices over the Internet.

The covert password manager 150 may be an application that stores, manages, secures and/or provides access to password information. As mentioned above, the covert password manager 150 may be located on a client device 110 or stored on a server 140. For example, the covert password manager 150 may represent a local password manager application that is installed on and executed by a client device 110 that is associated with an authorized user 105. Alternatively, or additionally, the covert password manager 150 may represent an application that is accessed over a network 190 (e.g., by a client device 110 operated by an authorized user 105). In the latter case, the covert password manager 150 may be associated with a website or cloud-based service that stores, protects and provides access to the password information.

Figure 3:
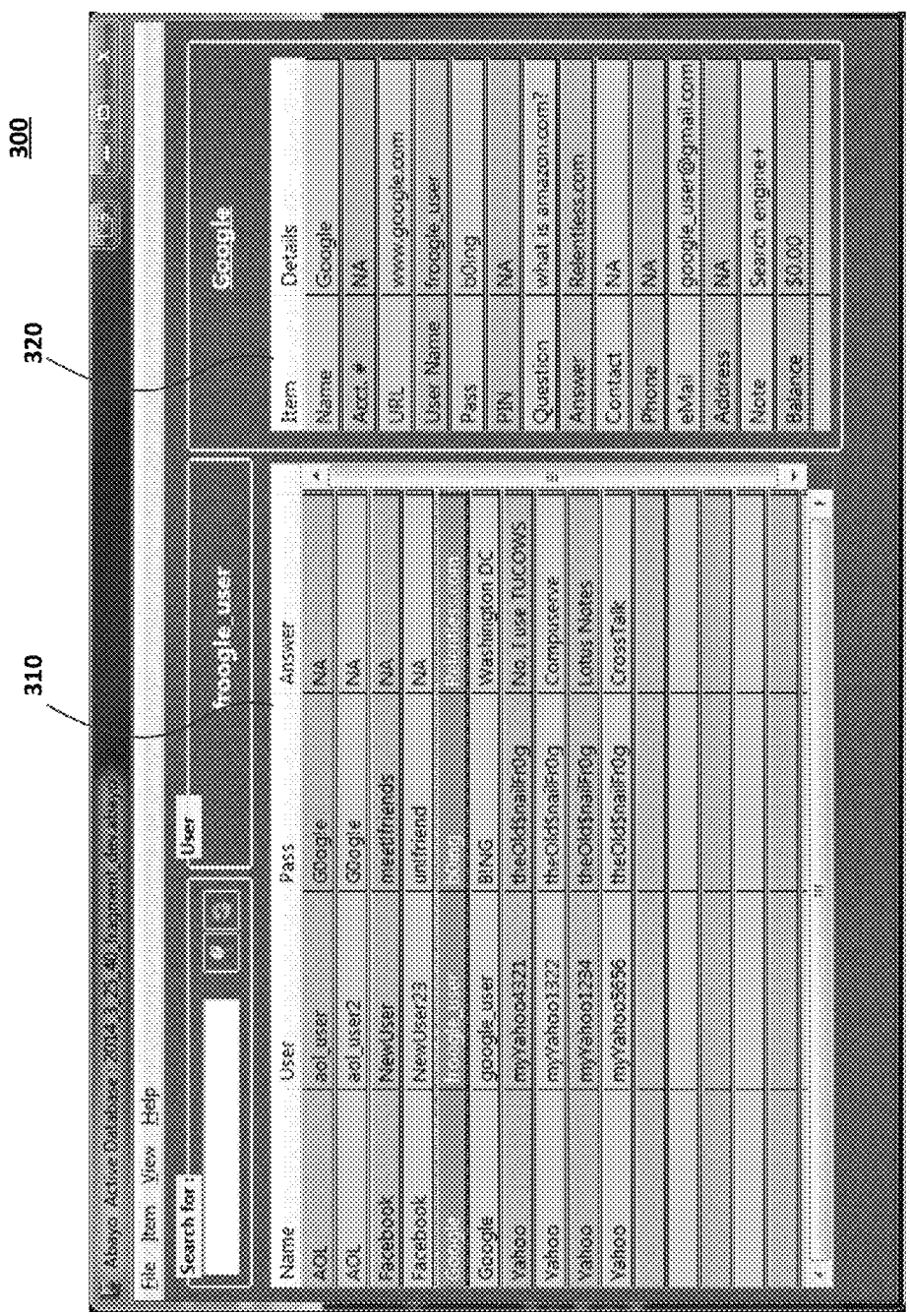
FIG. 3 illustrates an exemplary interface for managing password information in accordance with certain embodiments of the present invention.

The password information that is protected and managed by the covert password manager 150 may represent any information or data that is associated with authenticating a user, or which provides the user with access to an application or confidential information. For example, the password information which is protected by the covert password manager 150 may include login information that permits a user to access a website, application or device. The password information may include, inter alia, data such as usernames, passwords, personal identification numbers, identification codes, security questions, e-mail addresses or any other type of similar information. The password information may be stored in a database associated with the covert password manager 150 and may include one or more password entries each of which may be used to login to one or more security portals. FIG. 3, which is discussed in further detail below, illustrates an interface that displays exemplary password information that may be stored and associated with each password entry (e.g., the name of the company or entity associated with a login portal, a uniform resource locator that identifies a web page where the login credentials may be entered, a phone number, an address, etc.). Preferably, the database and associated password information is encrypted for security purposes.

Figure 2:
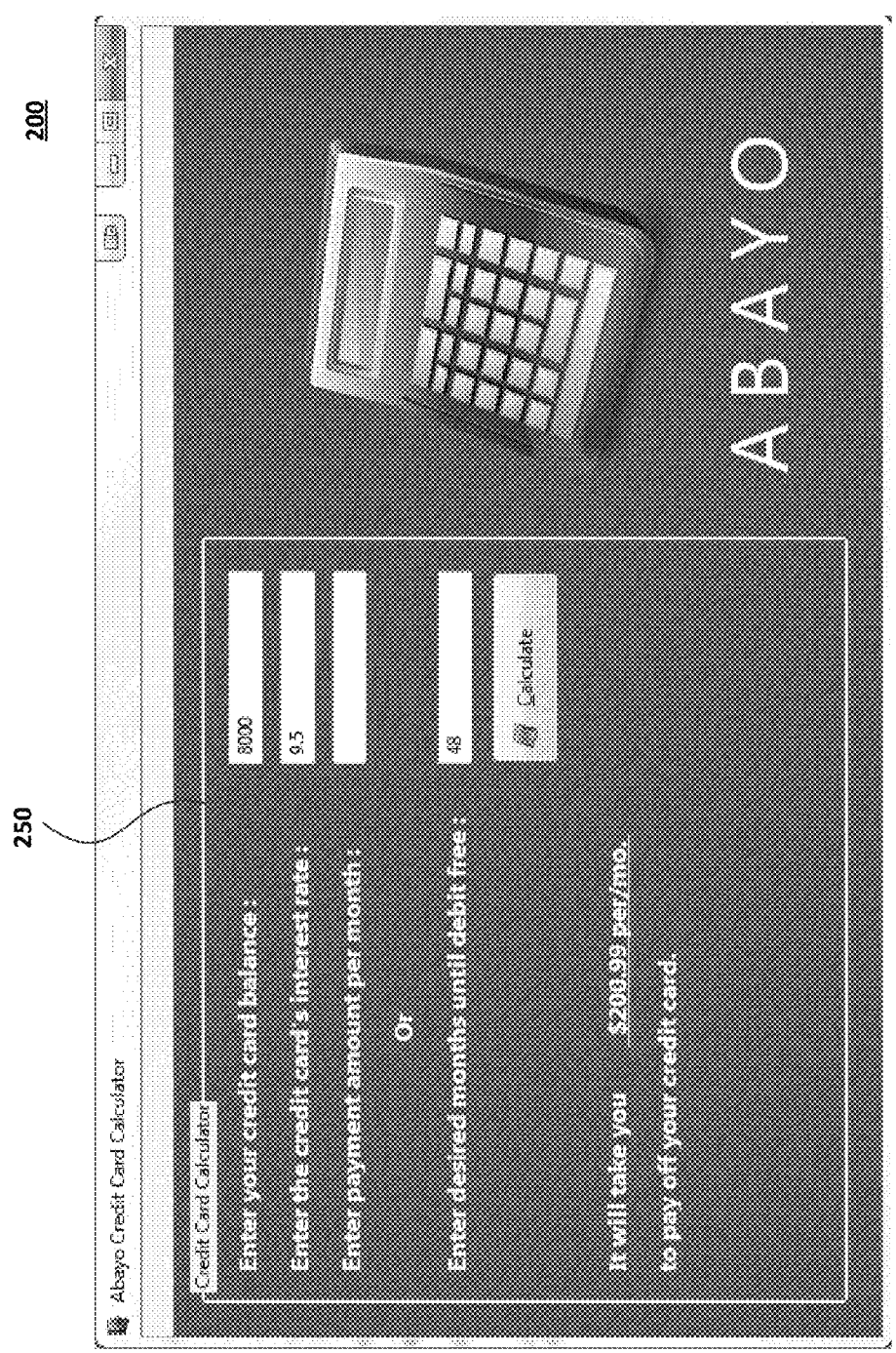
FIG. 2 illustrates an exemplary interface that includes a covert login screen in accordance with certain embodiments of the present invention.

In certain embodiments, the covert password manager 150 may include a decoy module 160 that provides functions associated with providing a decoy application. As used herein, the term "decoy application" does not necessarily refer to an application or executable file that is separate from the covert password manager 150. Instead, in certain embodiments, the decoy application may represent functions that are performed by the covert password manager 150. As explained herein, the decoy module 160 may be configured to provide certain security features that are used to protect the password information stored by the covert password manager 150. In particular, the decoy module 160 may be configured to disguise the covert password manager 150 such that it does not appear to be a password manager application or other similar type of application. For example, in response to a user executing the covert password manager 150, the decoy module 160 may present the user with one or more interfaces that serve to disguise the true functionality of the covert password manager 150 and which makes the covert password manager 150 appear to be a credit card calculator application (e.g., as illustrated in FIG. 2), a gaming application (e.g., for a crossword puzzle or other type of game), an educational application, a word processing application or other type of application. Generally speaking, the decoy module 160 may disguise the covert password manager 150 to appear as any type of decoy application that is not associated with managing password information or other confidential information. In the case that the covert password manager 150 is installed as a local application on a client device 110, the decoy module 160 may include a function for disguising an icon that is selectable to execute the application.

Preferably, the decoy module 160 is configured to provide functionality associated with the decoy application. For example, the decoy module 160 may be configured to function as a credit card calculator in the case that the decoy module 160 disguises the covert password manager 150 as a credit card calculator application. Thus, in response to receiving an input from a user via an interface associated with the decoy application, the decoy module 160 may output financial information that indicates how long it will take to pay off credit card debt. Similarly, the decoy module 160 may provide functionality that allows a user to complete a crossword puzzle game in the case that the covert password manager 150 is disguised as a crossword puzzle application. Because the true functionality of the covert password manager 150 is disguised, an unauthorized user 120 that executes the covert password manager 150 may never be aware that the underlying application is actually storing and protecting password information (or other confidential information) and, thus, will be prevented from attempting to access the password information.

The password manager module 170 is configured to provide functionality associated with managing the hidden password information, e.g., such as storing, encrypting, updating, editing and providing access to the password information. The password manager module 170 may provide various interfaces to users for performing these functions. For example, FIG. 3, which is discussed in further detail below, discloses an exemplary interface 300 that may be presented to authorized users 105 by the password manager module 170 for accessing or managing the password information after valid login credentials have been provided.

Before a user is permitted to access the password manager module 170 and/or password information that is protected by the covert password manager 150, the user may be required to provide certain input via one or more of the interfaces that are provided as part of the decoy application that is presented to the user by the decoy module 160. In certain embodiments, in response to receiving an input from a user, the covert password manager 150 may evaluate the input and determine whether the received input was provided by an authorized user 105 or an unauthorized user 120. For example, a determination may be made regarding whether the user is attempting to access the password information, or whether the received input was intended for use with the decoy function associated with the application (e.g., whether the input was provided by a user who intended to utilize the decoy application because the user was unaware of underlying password manager functionality of the application). If it is determined that the input was intended to be utilized with the decoy application, the covert password manager 150 will utilize the input to execute the functionality associated with the decoy application. For example, in the case of a decoy credit card calculator application, the received input may be used by the decoy application to calculate information related to paying off credit card debt and the relevant credit card debt information may be output to the user. On the other hand, if it is determined that the received input was provided as part of an attempt to access the password manager application, this will trigger the covert password manager 150 to evaluate the input and determine whether the input comprises valid login credentials for accessing the protected password information. The user may be provided with access to the password manager application if the user provides valid login credentials. Otherwise, the user will be denied access. In the case that access is denied, the covert password manager 150 preferably keeps the functionality of the password manager module 170 disguised from the user and continues to present the decoy application and associated interfaces to the user.

Any input that is received while the decoy application is presented to the user, or that is received via an interface associated with the decoy application, may be used as login credentials for accessing the password information that is protected by the covert password manager 170. The inputs may include inputs received from any type of input device including, but not limited to, a keyboard device, a mouse device (e.g., any left-clicks, right-clicks or inputs received from a scroll wheel on the mouse device) and/or a touch screen device (e.g., any taps or gestures). In certain embodiments, the inputs may include inputs that are received via an input form (e.g., which may include text fields, radio buttons, checkboxes or submit buttons) that is displayed as part of the decoy application. As explained below, a user may define the precise sequence of inputs that will allow a user to access the password information.

In certain embodiments, the process of validating a user's login attempt involves evaluating the data type of an input provided via a form or input field that is displayed to the user in connection with a decoy application. Commonly known data types may include integers, character strings, alphanumeric strings and floating-point numbers. An input field (e.g., such as a text field) on a form may appear to request a certain data type and may be associated with the data type. For example, an input field that requests a user's name would appear to be requesting a data type that is a character string, while an input field requesting a dollar amount would appear to be requesting an input that is an integer or a floating-point data type. When a user provides an input via a form that is provided as part of the decoy application, the covert password manager 150 may evaluate the data type of the input that is provided via one or more input fields and determine whether the provided input is of a data type that would be expected for executing the decoy application. This may involve retrieving stored data that associates the data fields with particular data types. The input may be used to execute the decoy application in the case that the data type of the input is of a type that is associated with the expected data type. On the other hand, a received input that is not of an expected data type may notify the covert password manager 150 that the user is attempting to login and access the password information. For example, if the user entered an integer into a data field that requests a user's name, the covert password manager 150 may determine that the user is attempting to login and access the password information.

In the case that it is determined that the user is attempting to login and access the password information (e.g., because an unexpected data type was received in an input field that was associated with a particular data type), the covert password manager 150 may analyze any input provided by the user to determine whether the user has provided valid login credentials. The input that is used to determine whether the user has entered valid login credentials may be provided via the same form which includes the input field that is used to determine whether the user is attempting to login and access the password information, or may be provided via a separate form (e.g., possibly a form that is presented on a separate interface associated with decoy application). Other inputs provided by the user which are submitted via the form may also be considered in determining whether the user has entered valid login credentials.

In certain embodiments, all or part of the input that is used to determine whether a user has entered valid login credentials comprises one or more input events that are not entered via an input form. Commonly known input events that may be used as part of the validation process may include, for example, one or more click events received from a mouse device (e.g., associated with a left-click or right-click provided via a mouse), one or more gesture events received via a touch screen device (e.g., tap gestures, swipe gestures, pan gestures or press and hold gestures) or input events received from other types of input devices. For example, in certain embodiments, a user may be required to select (e.g., with a mouse click or gesture) a portion of an interface displayed as part of the decoy application in order to provide valid login credentials. Thus, if the user did not select the portion of the interface, the user would not be able to login and access the password information. Other types of inputs that may be used can include the selection of function keys (e.g., F1-F12 keys) or position or movement of a cursor.

In certain embodiments, the login credentials may comprise a combination of both inputs received via a form and inputs that not received via a form (e.g., the user may be required to enter a password in a particular text field provided via an input form and also to select a portion of an interface that is not associated with the form in order to access the password information). Any combination of the above-described inputs may be used to determine whether a user is attempting to login and access the password information and/or whether the user has entered valid login credentials.

Figure 4:
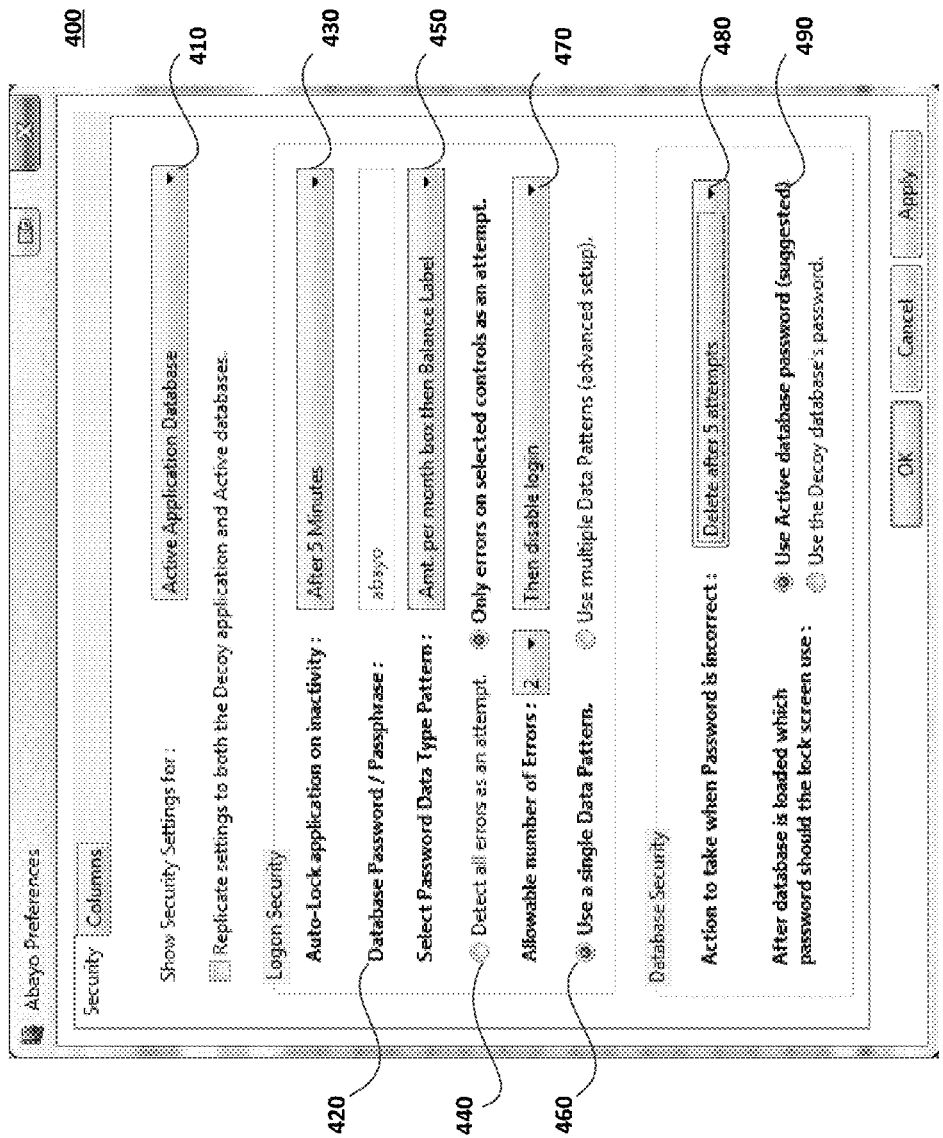
FIG. 4 illustrates an exemplary interface for configuring settings for a covert password manager in accordance with certain embodiments of the present invention.

In certain embodiments, after an authorized user 105 has entered valid login credentials, the password manager module 170 may permit the authorized user 105 to access one or more configuration interfaces that allow the user to configure a variety of different settings associated with the covert password manager 150. FIG. 4, which is discussed in further detail below, illustrates an exemplary configuration interface that permits the settings associated with the covert password manager 150 to be customized. The configuration interface may permit the user to specify the login credentials that will permit the user to access the password information. For example, the user may specify which fields of an input form that is provided as part of the decoy application are to be used in determining whether the user has entered valid login credentials. The user may also specify expected and/or unexpected data types for each of the input elements included in the form. The configuration interface may also allow the user to specify other types of inputs (e.g., click events or gesture events) that should be utilized as part of the login credentials for accessing the password information.

In certain embodiments, the configuration interface may also permit a user to change the appearance and/or functionality of the decoy application. For example, the user may be permitted to adjust the title, text, name, icon, images and color scheme of the decoy application. The user may further be permitted to add, remove or edit input fields that are included in the decoy application. In certain embodiments, the user may be permitted to select different templates that allow the user to adjust the appearance and/or functionality of the application. For example, a set of design templates may be provided which permit the user to adjust the color scheme and/or interface layout of the decoy application. Likewise, a set of functional templates may be provided for adjusting the functionality of the decoy application. For example, a first functional template may permit the user to configure the decoy application to be a credit card calculator application, while a second functional template may permit the user to configure the decoy application to be a crossword puzzle application. Any number of design or functional templates may be provided. The user can select the design and functional templates in order to customize the decoy application. After the user has selected one or more templates, the user may access interfaces that permit the user to adjust default settings associated with the selected templates in order to further customize the decoy application. All of the information and data associated with customizing the decoy application, including the templates and user selections, may be stored in a database associated with the covert password manager 150. As explained below, other types of settings may also be customized using the configuration interface.

It should be recognized that the security features provided by the covert password manager 150 provide several advantages that can be used to assist a user with protecting password information or other types of confidential information. Even if an unauthorized user 120 gains access to a device (e.g., personal computer, phone or server) that stores the information, the unauthorized user 120 would not be aware that there is an application that is storing the sensitive information since the application is disguised. Moreover, if the unauthorized user 120 is somehow aware of the existence of the underlying sensitive information, the unauthorized user 120 would have no idea how to access the password information since the covert password manager 150 does not present a traditional login screen or login process to authenticate a user. As a result, the covert password manager 150 is able to provide a much greater level of security for the underlying information.

Other advantages stem from the customization features that are provided by the covert password manager 150. Because the configuration interfaces provided by the covert password manager 150 permit the user to change the appearance and/or functionality of the decoy application, the user can design a unique decoy application that does not look like any other decoy application. If a user was not able to customize the decoy application in this manner, widespread distribution of the covert password manager 150 may become an issue since unauthorized users 105 may eventually become aware of the appearance of the decoy application (since all would look the same) and may, therefore, recognize that the application is truly an application that protects sensitive information.

It should be noted that the system in FIG. 1 is merely meant to demonstrate an embodiment of an operating environment that can be utilized in conjunction with the inventive principles taught herein, and should not be construed as limiting in any manner whatsoever. The particular configuration in FIG. 1 can be altered in numerous ways without departing from the principles herein. For example, it should be noted that the functionality of the server 140 in FIG. 1 may be carried out by a plurality of servers. Likewise, although this figure depicts a single client device 110 and two unauthorized user devices 130, any number of client devices 110 and unauthorized user devices 130 may be connected to the system and the system may be configured in a variety of different ways (e.g., in a distributed computing environment, cloud-based environment, client-server environment, etc.). Furthermore, it should also be recognized that the functionality associated with covert password manager 150 may be performed entirely by the client devices 110 or the server 140, or may be performed jointly by the client devices 110 and the server 140.

Moving on to FIGS. 2-4, exemplary interfaces are disclosed for providing a covert password manager 150. More specifically, FIG. 2 discloses an exemplary interface 200 that may be displayed by a decoy module 160 that is configured to disguise the covert password manager 150 as a credit card calculator application. FIG. 3 discloses an exemplary interface 300 that may be displayed by the password manager module 170 for managing password information after valid login credentials have been provided. FIG. 4 illustrates an exemplary interface 400 for configuring settings for a covert password manager.

As shown in FIG. 2, the interface 200 includes an input form 250 associated with a decoy credit card calculator application. This interface may be disclosed in response to executing the covert password manager 150 locally on a client device 110 or in response to accessing a server 140 (e.g., via a web browser) that includes a covert password manager 150. In the case that the covert password manager 150 is launched locally on the client device 110, the application icon associated with launching the covert password manager 150 may also be disguised (e.g., may appear to be disguised as an icon associated with a credit card calculator application) to assist with disguising the application.

A user that is presented with the interface 200 may supply integer and/or floating-point values in the fields to utilize the credit card application. The user may then select the "Calculate" button and the decoy module 160 may utilize the input to perform calculations that would be expected of a normal or typical credit card calculator application and to display the resulting calculations to the user. In this example, a user has provided input to the input form 250 that indicates that the user's credit card balance is $8000, that the interest rate for the credit card is 9.5% and that the user wishes to pay off the debit with 48 months. In response to selecting the "Calculate" button, the decoy module 160 executes the software code associated with the decoy application to perform the relevant calculations and also updates the interface to inform the user that the user will be required to pay $200.99 per month to pay off the debt within the specified time frame.

The interface 200 also serves as a covert login screen that may be utilized to submit login credentials and access the password information that is protected by the covert password manager 150. In order to determine whether the input provided via the form 250 is being submitted as an attempt to login and access the password information, one or more of the input fields may be associated with an expected data type. The covert password manager 150 may analyze the data type of the information submitted via the one or more of the fields. It may be determined that the user is attempting to login if the data type of the input provided via the one or more of the input fields does not match the expected data type that is associated with the one or more of the input fields.

In this example, it may be expected that the user will enter an integer or floating-point value in the upper input filed that requests the user's credit card balance. Thus, if the user enters an integer or floating-point value in this field, the decoy module 160 may utilize this value to execute the decoy application. In this case, the covert password manager 150 may not evaluate the input any further for the purpose of determining whether the user is attempting to login and access the password information. On the other hand, if the user enters a textual character string in this field, the covert password manager 150 may analyze the input provided via the form 250 and attempt to use this information to login and access the password information. Any input provided via the form 250 may be used to determine whether the user has entered valid login credentials. For example, the character string entered in the input field associated with the user's credit card balance may be used as a password that can be used to access the password information. Alternatively, while the submission of an unexpected data type in the credit card balance field may indicate that the user is attempting to access the password information, the input provided via this field or other input fields of the form 250 may be used as a username and/or password for accessing the password information.

In certain embodiments, other types of input and/or input events may be used in conjunction with the input provided via the form 250 to determine whether the user may access the password information. For example, as part of the login process, the user may be required to click on the image of the calculator located on the right-hand portion of the interface. In other cases, the user may be required to press and hold a particular combination of keys (e.g., the shift key and escape key) for a predetermined period of time before submitting the input via the input form 250. Other types of inputs may also be utilized as part of the login process.

FIG. 3 is an exemplary interface 300 that may be displayed by the password manager module 170 to a user who has entered valid login credentials. As shown, the user may be presented with a listing of password entries 310. Each entry in the listing 310 may be associated with password information for accessing a particular authentication or login portal. For example, the password information for one entry may be used to login to a Facebook™ account, while the password information associated with another entry may be used to login to a user's Google™ account. For each entry, the listing 310 displays the name of account, a username, a password and an answer to a security question.

An entry in the listing may be selected to view and/or edit details pertaining to the password information for the entry and/or details associated with the particular account that is associated with the entry. Any data associated with an entry may be displayed in the detailed information window 320 located on the right-hand portion of the interface 300. In this example, the detailed information window 320 includes the following information for the selected entry: the name of the account, the account number, a uniform resource locator (URL) associated with the account, a username, a password, a personal identification number (PIN), a security question, a contact, phone number, an e-mail address, a street address, additional notes associated with the account (e.g., which may include a description regarding what the password information is being used to access), and an account balance. The password manager module 170 may generally store any information that is associated with accessing or logging into an account, or other information that is otherwise associated with the account.

FIG. 4 illustrates an exemplary configuration interface 400 that may be used to customize the settings of the covert password manager 150. A database selection option 410 permits the user to select the database that should be configured. For example, the covert password manager 150 may permit the user to create a plurality of different databases for securely storing password information (or other confidential information) and may allow the user to store the databases anywhere (e.g., on a local device, on a local network or at a location on the Internet). Different configuration settings can be specified for each database that is created. Thus, the database selection option 410 permits the user to select that database for which the settings are to be configured.

An inactivity option 430 permits the user to specify a time limit after which the user will be logged out of the password management portion of the application. For example, after a user has entered valid login credentials and logged into the password management module, the user may automatically be logged out or locked out if the user is inactive for a predetermined time period (e.g., five minutes) which can be specified by the inactivity option 430.

A password field 420 permits the user to specify a password that should be used as part of the login credentials and a credential entry option 450 permits the user to specify the parameters for entering the login credentials. In certain embodiments, the credential entry option 450 may include a variety of different pre-configured options for entering the login credentials. In this example, an option is selected that specifies that the password specified by the password field 420 should be entered in the amount per month field (i.e., the third input field from the top as shown in FIG. 2) and that the user should select the text located to the left of the balance field (i.e., the text which recites "Enter your credit card balance:") as part of the process of submitting login credentials.

The credential entry option 450 may provide numerous additional options for submitting login credentials as well. As another example, an option may be provided that specifies that the user is to enter the password in a particular input field and subsequently select the F12 (or other function key) in order to login. As an even further example, the credential entry option 450 may provide an option that specifies that the specified password should be entered into a particular input field and that the image of the calculator (located on the right portion of FIG. 2) should be selected (e.g., with a mouse click or tap gesture) in order to login. Other login options may also be provided by the credential entry option 450. All of the predetermined settings associated with the credential entry option 450 may be stored in a database associated with the covert password manager 150. In certain embodiments, the user may be permitted to add additional login options and/or edit existing login options that can be used for specifying the login credentials (e.g., as discussed below with reference to FIG. 4A).

Figure 4A:
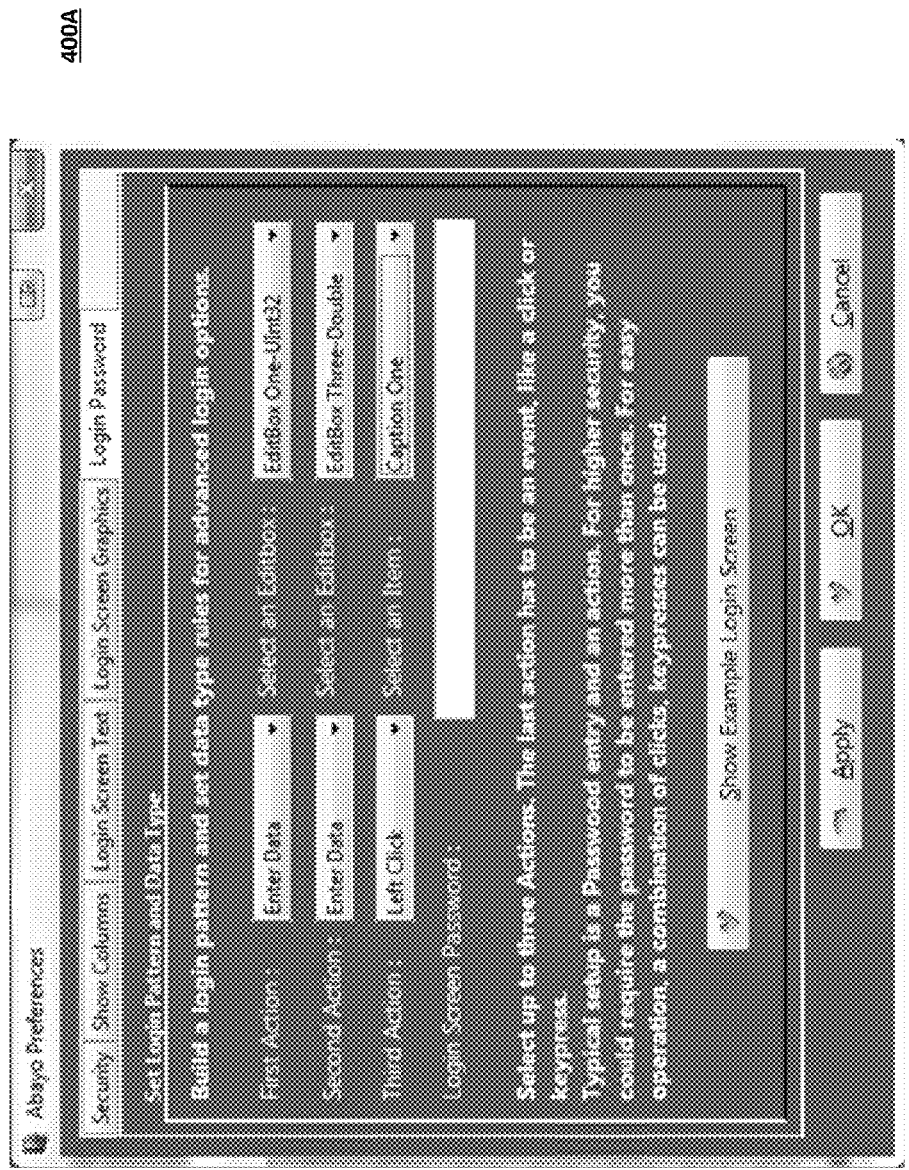
FIG. 4A illustrates an exemplary interface for specifying login credentials in accordance with certain embodiments of the present invention.

Another option 460 permits a user to specify whether a single credential entry option 450 should be used to specify the login credentials, or whether a plurality of credential entry options 450 should be utilized to specify the login credentials. For example, as illustrated in FIG. 4A, login credentials may be specified which require a plurality of different actions to be taken.

As mentioned above, the process of evaluating whether a user has entered valid login credentials may also involve analyzing whether the user has provided an expected or unexpected data type in one or more of the fields provided via a form associated with the decoy application. Thus, the configuration interface 400 may also include a data type detection option 440 that permits the user to specify which input fields should be analyzed for this purpose. In this example, the data type detection option 440 includes two preferences. A first preference specifies that entry of an unexpected data type in any input field (e.g., any field in FIG. 2) indicates that a user is attempting to login. Thus, if the user entered an unexpected data type in any of the input fields, the covert password manager 150 may determine that the user is attempting to login and would evaluate the input provided by the user to determine whether the user entered valid login credentials (e.g., may evaluate the input based on the settings specified by the password field 420 and the credential entry option 450).

The second preference specifies that the entry of the unexpected data type in only certain fields will be interpreted as a login attempt. In certain embodiments, the selected field may be a field that is identified by the credential entry option 450. In certain embodiments, the user may be permitted to select any field included in a form provided by the decoy application and the data type of the input received via the field may be evaluated for the purpose of determining whether the user is attempting to login and access the password information.

An allowable error option 470 allows the user to specify the permissible number of login attempts that are allowed before a user is no longer permitted to login and access the password information (at least for a limited period of time). A first security option 480 allows the user to specify certain actions that can be taken in response to receiving invalid login credentials. In this example, the user selected an option that specifies that the password information protected by the covert password manager 150 should be deleted in response to receiving five consecutive invalid login attempts. Rather than deleting the password information, other exemplary settings may be selected. For example, the user may select an option that causes the covert manager application 150 to disable the login feature or to send an alert (e.g., via e-mail or text message) to the user in response to receiving a certain number of invalid login attempts. In certain embodiments, the user may also specify the number of invalid login attempts that will trigger the action identified by the first security option 480.

A second security option 490 may allow the user to specify a password that should be used to re-access the password information after the user has been logged out or locked out due to inactivity. For example, as explained above, an inactivity option 430 may lock a user out if the user is inactive for a predetermined period of time. Thus, the second security option 490 permits the user to specify a password that will permit the user to access the password information after being logged out/locked out.

FIG. 4A illustrates an exemplary interface 400A that permits a user to specify and define login credentials for accessing the password information that is protected by the covert password manager 150. In this example, the user is permitted to select up to three actions that may be required for submitting valid login credentials. Exemplary actions may include the following:

Key press events: If an action for a key press event is selected, then the user may further select a function key (or other key) on a keyboard that is to be associated with the key press event. A a user who is attempting to login and access the password information may then be required to select the specified key as part of the input that is required to login and access the password information.

Data form entry events: A data form entry event generally relates to an input event that is received via an input form. If an action for a data form entry event is selected, a user attempting to login and access the password information may be required to enter data having a particular data type into an input field of a form provided in conjunction with the decoy application. Notice in the exemplary interface shown in FIG. 4A, the drop-down menu permits a user to select and specify the input field (e.g., "Edit Box One" and "Edit Box Three"), as well as the data type that is associated with the field (e.g., "UInt32" or "Double").

Click events: If an action for a click event is selected, then a user attempting to login and access the password information may be required to perform a mouse click (e.g., a left-click or right-click) on a portion of an interface that is provided in conjunction with the decoy application. For example, a user may be required to click on an image or text (e.g., a text label for an input field or image caption). The user may specify the portion of the interface that is to be clicked on or selected.

After the user has selected one or more actions and associated parameters for defining the login credentials, the user may select a button for saving the new settings as a new login option and/or changing the existing login settings for the covert password manager 150. The user may also select an option for displaying an exemplary login screen that is configured to utilize the new login settings. This enables the user to test the login settings that have been created before the settings are actually applied to the covert password manager 150.

Figure 5:
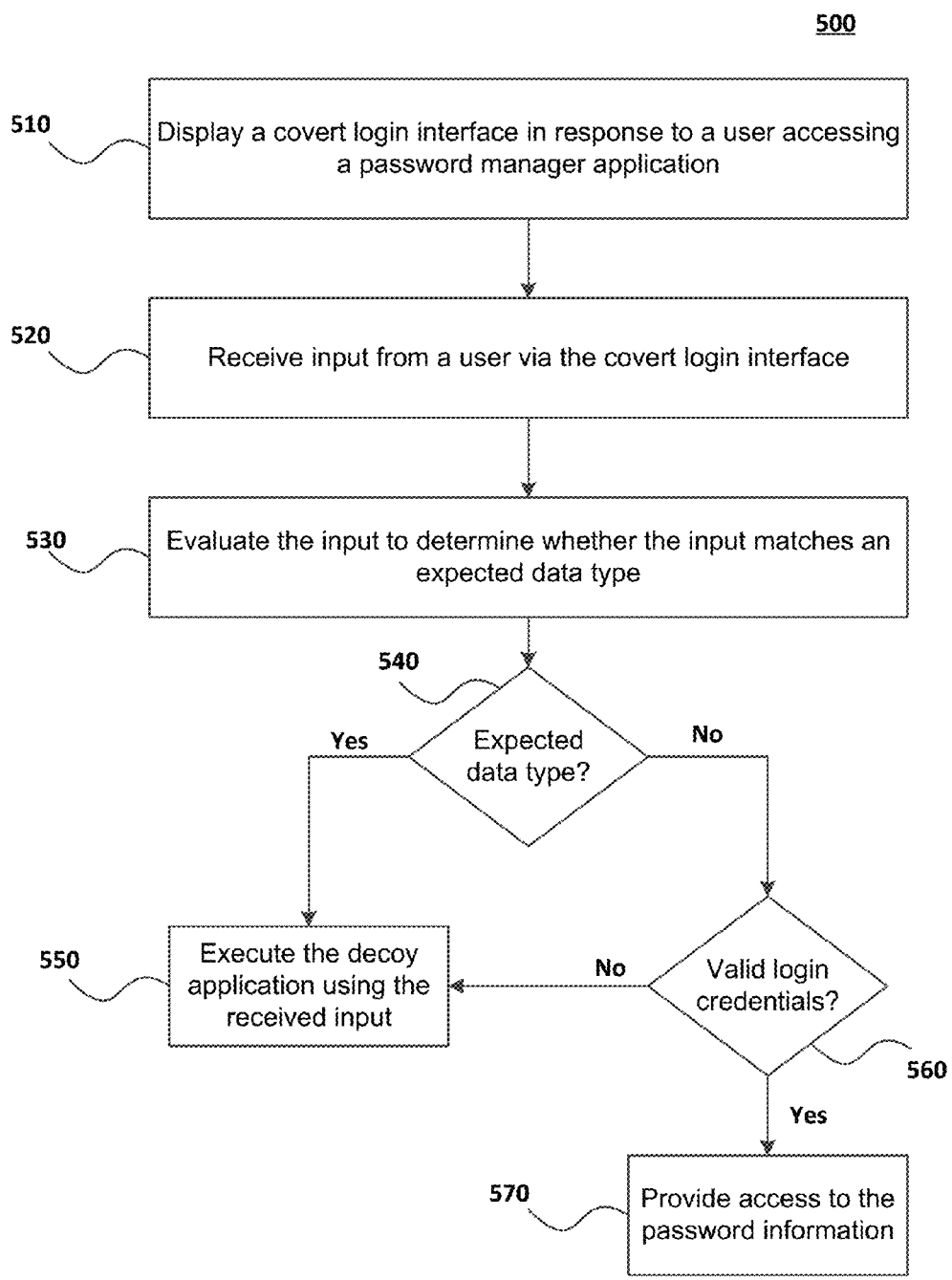
FIG. 5 is a flow chart of a method for validating login credentials in accordance with certain embodiments of the present invention.

FIG. 5 is a flow chart of a method 500 for validating login credentials in accordance with certain embodiments of the present invention. This exemplary method may be executed by a server 140 or a user device (e.g., an authorized user device 110). A covert login interface is displayed in response to a user accessing a password manager application (step 510). FIG. 2 illustrates an exemplary covert login interface that disguises the password manager application to look like a credit card calculator application.

Next, input is received from the user via the covert login interface (step 520). As explained above, the input may be received via a form that is presented on the covert login interface and/or may include other types of inputs (e.g., click inputs, gesture inputs or inputs from function keys). The input provided by the user is evaluated in order to determine whether the input matches an expected data type (step 530). For example, an input field included on a form that is displayed on the covert login interface may be associated with an expected data type. The expected data type may represent a data type that would be expected if a user was attempting to execute the decoy application associated with the covert login interface. For example, in the exemplary interface shown in FIG. 2, the expected data type may include integer or floating point values, since the covert login interface would appear to be requesting numerical values for computing the credit card payment information.

A determination is then made as to whether the data type of the received input matches the expected data type (step 540). If the data type of the input does match the expected data type, then it may be assumed that the user is not an authorized user and the input may be utilized to execute a decoy function (e.g., to execute a function for performing credit card payment calculations) (step 550).

On the other hand, if the data type of the received input does not match the expected data type, then the input provided by the user may be analyzed to determine whether the user has submitted valid login credentials (step 560). The input will once again be utilized to execute the decoy function in the case that it is determined that valid login credentials have not been provided. Otherwise, if valid login credentials have been provided, then the user is granted access to the password information (step 570). For example, the user may be presented with the interface shown in FIG. 3 which permits the user to access and manage the password information.

While there have shown and described and pointed out various novel features of the invention as applied to particular embodiments thereof, it will be understood that various omissions and substitutions and changes in the form and details of the systems and methods described and illustrated may be made by those skilled in the art without departing from the spirit of the invention. Amongst other things, the steps shown in the methods may be carried out in different orders, in many cases where such may be appropriate. Those skilled in the art will recognize, based on the above disclosure and an understanding therefrom of the teachings of the invention, that the particular hardware and devices that are part of the system described herein, and the general functionality provided by and incorporated therein, may vary in different embodiments of the invention. Accordingly, the particular system components shown in the figures are for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation.

What is claimed is:

1. A system configured to provide access to confidential information, comprising:
    a computing device having a processor and physical memory, the physical memory storing instructions that cause the processor to:
        provide an application that is configured to protect confidential information, wherein the application comprises:
            a confidential information manager module configured to perform management functions associated with accessing and managing the confidential information; and
            a decoy module configured to disguise the management functions of the application by providing a decoy function and one or more associated interfaces that are unrelated to managing the confidential information;
        in response to receiving a request to access the application, provide instructions for rendering an interface associated with the decoy function that includes an input form;
        evaluate input received via the input form to determine whether the input is being provided to access the confidential information or to execute the decoy function, wherein evaluating the input at least includes analyzing one or more data types of the received input;
        in response to determining that the input is being provided to access the confidential information, analyze at least a portion of the input to determine whether the input comprises valid login credentials; and provide access to the confidential information in response to determining that valid login credentials have been submitted;

wherein the application provides access to a configuration interface that permits login credentials to be specified by selecting one or more keyboard events, click events or data form entry events, and by associating at least one expected data type with the input form.

2. The system of claim 1, wherein the input is utilized to execute the decoy function in response to determining that the data type of the received input matches the at least one expected data type associated with input form.

3. The system of claim 1, wherein the login credentials are comprised of one or more character-based inputs that are submitted via the input form and one or more non-character inputs, and the one or more non-character inputs are selected from the group consisting of: a click input on an interface element that is not part of the input form, a position of a cursor on an interface associated with the decoy function, or a selection of a function key while an interface associated with the decoy function is displayed.

4. The system of claim 1, wherein access is provided to the configuration interface after valid login credentials have been provided to enable retrieval of the confidential information.

5. The system of claim 4, wherein the configuration interface permits login credentials to be specified and the configuration interface at least includes:

a first input option that enables a keyboard event pertaining to a function key to be associated with the login credentials;

a second input option that enables a click event to be associated with the login credentials; or a third input option that enables a data form entry event to be associated with the login credentials;

wherein one or more selections associated with the first input option, second input option or third input option are stored in a database associated with the application and the one or more selections are retrieved from the database to determine whether valid login credentials have been entered.

6. The system of claim 4, wherein the configuration interface permits a design, appearance or functionality of the interfaces associated with the decoy module to be customized.

7. The system of claim 6, wherein the configuration interface provides at least one of: a plurality of design templates for customizing the design and appearance of the interfaces; or a plurality of functional templates for selecting different decoy functions.

8. A method for providing access to confidential information, comprising:

providing an application that is configured to protect confidential information, wherein the application comprises:

a confidential information manager module configured to perform management functions associated with accessing and managing confidential information; and a decoy module configured to disguise the management functions of the application by providing a decoy function and one or more associated interfaces that are unrelated to managing the confidential information;

in response to receiving a request to access the application, providing instructions for rendering an interface associated with the decoy function that includes an input form;

storing data on a non-transitory computer storage medium that associates at least one expected data type with at least one input field of the input form;

evaluating, with a processor, input received via the input form to determine whether an attempt is being made to access the confidential information or to execute the decoy function, wherein evaluating the input at least includes analyzing the at least one input field to determine whether input received via the at least one input field is associated with the expected data type;

in response to determining an attempt is being made to access the confidential information, analyzing at least a portion of the input with the processor to determine whether the input comprises valid login credentials;

providing access to the confidential information in response to determining that valid login credentials have been submitted;

wherein the application provides access to a configuration interface that permits login credentials to be specified by selecting one or more keyboard events, click events or data form entry events, and by associating the at least one expected data type with the input form.

9. The method of claim 8, wherein the input is utilized to execute the decoy function in response to determining that a data type of the received input matches the at least one expected data type associated with input form.

10. The method of claim 8, wherein the login credentials are comprised of one or more character-based inputs that are submitted via the input form and one or more non-character inputs, and the one or more non-character inputs are selected from the group consisting of: a click input on an interface element that is not part of the input form, a position of a cursor on an interface associated with the decoy function, or a selection of a function key while an interface associated with the decoy function is displayed.

11. The method of claim 8, wherein access is provided to the configuration interface after valid login credentials have been provided to enable retrieval of the confidential information.

12. The method of claim 11, wherein the configuration interface permits login credentials to be specified and the configuration interface at least includes:

a first input option that enables a keyboard event pertaining to a function key to be associated with the login credentials;

a second input option that enables a click event to be associated with the login credentials; or a third input option that enables a data form entry event to be associated with the login credentials and which permits a data type to be associated with the data form entry event;

wherein one or more selections associated with the first input option, second input option or third input option are stored in a database associated with the application and the one or more selections are retrieved from the database to determine whether valid login credentials have been entered.

13. The method of claim 11, wherein the configuration interface permits a design, appearance or functionality of the interfaces associated with the decoy module to be customized.

14. The method of claim 13, wherein the configuration interface provides at least one of: a plurality of design templates for customizing the design and appearance of the interfaces; or a plurality of functional templates for selecting different decoy functions.

15. A non-transitory computer storage medium comprising a computer readable program for protecting confidential information, wherein the computer readable program when executed on a computer causes the computer to:
provide an application that is configured to protect confidential information, wherein the application comprises:
a confidential information manager module configured to perform management functions associated with accessing and managing the confidential information; and
a decoy module configured to disguise the management functions of the application by providing a decoy function and one or more associated interfaces that are unrelated to managing the confidential information;
in response to receiving a request to access the application, provide instructions for rendering an interface associated with the decoy function that includes an input form;
evaluate input received via the input form to determine whether the input is being provided to access the confidential information or to execute the decoy function, wherein evaluating the input at least includes analyzing one or more data types of the received input;
in response to determining that the input is being provided to access the confidential information, analyze at least a portion of the input to determine whether the input comprises valid login credentials; and
provide access to the confidential information in response to determining that valid login credentials have been submitted;
wherein the application provides access to a configuration interface that permits login credentials to be specified by selecting one or more keyboard events, click events or data form entry events, and by associating at least one expected data type with the input form.

16. The computer storage medium of claim 15, wherein the input is utilized to execute the decoy function in response to determining that the data type of the received input matches the at least one expected data type associated with input form.

17. The computer storage medium of claim 15, wherein the login credentials are comprised of one or more character-based inputs that are submitted via the input form and one or more non-character inputs, and the one or more non-character inputs are selected from the group consisting of: a click input on an interface element that is not part of the input form, a position of a cursor on an interface associated with the decoy function, or a selection of a function key while an interface associated with the decoy function is displayed.

18. The computer storage medium of claim 15, wherein access is provided to the configuration interface after valid login credentials have been provided to enable retrieval of the confidential information.

19. The computer storage medium of claim 18, wherein the configuration interface permits login credentials to be specified and the configuration interface at least includes:
a first input option that enables a keyboard event pertaining to a function key to be associated with the login credentials;
a second input option that enables a click event to be associated with the login credentials; or
a third input option that enables a data form entry event to be associated with the login credentials;
wherein one or more selections associated with the first input option, second input option or third input option are stored in a database associated with the application and the one or more selections are retrieved from the database to determine whether valid login credentials have been entered.

20. The computer storage medium of claim 19, wherein the configuration interface permits a design, appearance or functionality of the interfaces associated with the decoy module to be customized based on at least one of: a plurality of design templates for customizing the design and appearance of the interfaces; or a plurality of functional templates for selecting different decoy functions.

* * * * *